Oct. 21, 1941. F. P. SCULLY ET AL Re. 21,930

AUDIBLE SIGNAL DEVICE

Original Filed Oct. 7, 1936 2 Sheets-Sheet 1

Witness

Paul F. Bryant

Inventors

Frank P. Scully
Alcide E. Mathey
by their attorneys
Fish Richardson Carr & Gurney Oct. 21, 1941. F. P. SCULLY ET AL Re. 21,930

AUDIBLE SIGNAL DEVICE

Original Filed Oct. 7, 1936 2 Sheets-Sheet 2

Witness
Paul F. Bryant

Inventors
Frank P. Scully
Alajle E. Weather
by their Attorneys
Fish & Richardson & Carr & Jaeger Reissued Oct. 21, 1941

Re. 21,930

UNITED STATES PATENT OFFICE 21,930

AUDIBLE SIGNAL DEVICE

Frank P. Scully, Cambridge, and Alcide E. Mathey, Boston, Mass., assignors to Scully Signal Company, Cambridge, Mass., a corporation of Massachusetts Original No. 2,140,559, dated December 20, 1938, Serial No. 104,488, October 7, 1936. Application for reissue December 18, 1940, Serial No. 370,734

13 Claims. (Cl. 116—109)

The present invention relates to audible signal devices which are designed to indicate the attainment of a predetermined height in a closed tank by a rising liquid level during the process of filling.

The purpose and object of the present invention is the provision of an extremely simple and effective device of this character which shall sound an audible signal until a rising liquid level reaches a predetermined height and thereafter discontinue upon attainment of the indicated level.

In pursuance of this and other objects, we have developed an audible vent alarm for closed containers which consists essentially of a venting conduit from the container to atmosphere with an audible signal device in series with the conduit. The conduit is essentially provided with an open lower end, the position of which determines approximately the level at which the audible signal is to be discontinued. Associated with the conduit are means which permit continued venting through the signal device without causing audible operation thereof. This is accomplished by varying the characteristics of the venting stream in such a manner as to avoid actuation of the whistle except when the venting stream enters the conduit from the open lower end. In the actual reduction of our invention to practice, we have found that if a tubular venting conduit, open at its lower end, is provided with an orificed diaphragm constituting a whistle, then the passage of air or gas through the conduit from the lower end will cause actuation of the whistle. If, in addition, we provide one or more openings presumably in the side of the conduit in reasonable proximity to the whistle, then an air stream entering the conduit through these openings will not audibly sound the whistle. We do not attempt to account exactly for this mode of operation except that we believe that an air stream entering the side of the conduit or at an angle thereto or in such a manner as to unbalance a generally uniform flow of air throughout the cross-section of the conduit and in the direction of its length interferes sufficiently with the functioning of the whistle to avoid audible sounding. In this connection, we have found that an orifice in the side of the conduit located slightly below the whistle and either circular, oval or rectangular, will accomplish the purpose and that a reduction of the lower end of the conduit in half with an upper opening lengthwise of the conduit will also accomplish the desired result. In all cases, the signal audibly sounds so long as an air stream can enter the conduit from the lower open end and pass lengthwise thereof. In this case, the presence of the openings does not interfere with the sounding of the signal. When the rising liquid level blocks the open lower end, continued venting is compelled through side orifices or their equivalent, and the signal fails to sound even though the same essential volume of gas or vapor may be passing therethrough. This type of construction provides an extremely simple and efficient method of audibly indicating the attainment of predetermined levels in all cases where venting from the closed container may be satisfactorily accomplished by the single vent in which the signal is located or, in other words, where the orifice of the signal itself creates sufficient venting capacity. In those cases where the signal orifice itself is insufficient or cannot practically be made large enough to be sufficient, then continued venting after the predetermined level has been reached must be accomplished by bypassing gases or vapors in some fashion about the signal device.

In the accompanying drawings illustrating the preferred form of the invention,

Figure 1:
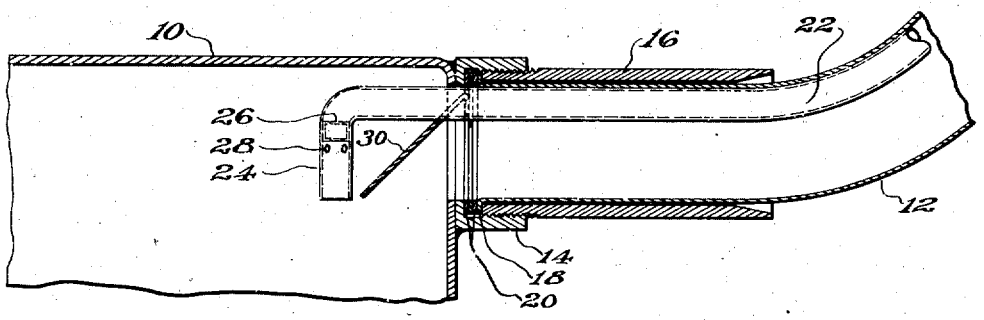
Fig. 1 illustrates a cross-sectional elevation of an audible venting device introduced into the filler pipe of a motor vehicle fuel tank.

In the illustrated embodiment of the invention, the usual fuel tank of a motor vehicle is indicated at 10 and is provided with a fuel pipe 12 entering the side of the tank adjacent the top. This fuel pipe extends outwardly into a position conveniently accessible to the operator. It may be attached to the side of the tank through a sleeve coupling 14 welded to the side of the tank and threadedly connected with a complementary member 16, the two members of the coupling serving to clamp between them an out-turned flange 18 on the fuel pipe, together with suitable packing rings 20. In order to determine when the contents of the fuel tank have reached a predetermined level, without resorting to gages or similar devices, we provide a vent pipe 22 within the fuel pipe and having a down-turned end 24 within the tank, which, as shown in Fig. 1, terminates at approximately the level of the bottom of the feed pipe. This downturned open end 24 predetermines the liquid level at which audible indication ceases, as will be hereinafter more fully described. As indicated, the vent is provided above the open end with an orificed whistle indicated at 26 and openings 28 in the side of the vent and in proximity to the whistle. The entering passage through the fuel pipe 12 is partially restricted by an inclined baffle 30 which tends to divert incoming liquid from the lower end of the vent pipe and also restrict the passage in the feed pipe to insure substantially against venting of gas or air therethrough.

Figure 2:
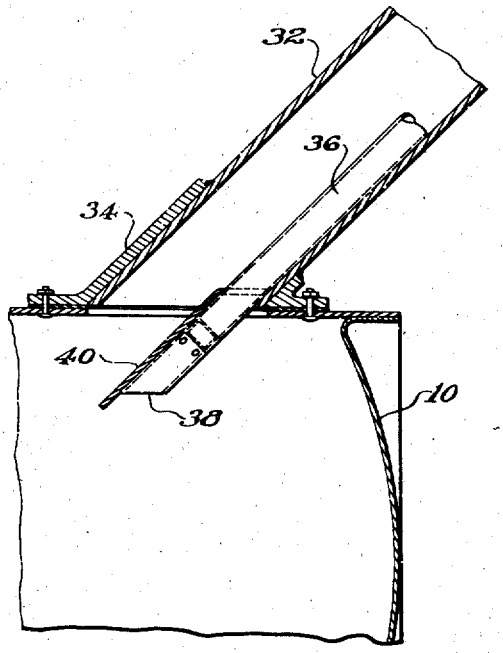
Fig. 2 is a similar cross-sectional view with a different form of filler pipe.

Fig. 2 illustrates a slightly modified form of construction in which the tank 10 is provided with an inclined feed pipe 32 entering the top of the tank through a fitting 34. The vent pipe 36 extends lengthwise of the feed pipe and projects at its lower end into the tank a predetermined distance, the open lower end 38 of the vent serving to indicate a predetermined liquid level as in the case of the construction shown in Fig. 1. A baffle 40 extends across the feed pipe to partially restrict the entering passage and insure escape through the vent pipe, as previously described.

Figure 3:
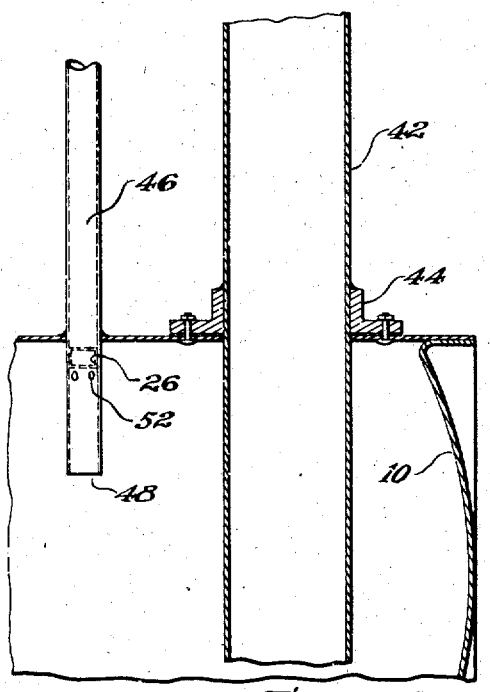
Fig. 3 is a third type in which the filler and vent are separate.

In the construction shown in Fig. 3, the tank 10 is provided with a feed pipe 42 entering the top thereof through a connection 44. This feed pipe extends through the tank to a point adjacent the bottom so that the lower end of the feed pipe is always trapped against escape of gas or air so long as fuel remains in the tank. A separate vent 46 enters the tank and has an open lower end located at 48. This vent, similar to those shown in Figs. 1 and 2, is provided with an audible whistle 26 and with side orifices 52.

All of the constructions shown in Figs. 1 to 3 inclusive have a common mode of operation, namely, the liquid delivered to the tank through the feed pipe causes escape of air and gas through the open lower end of the vent as the liquid level within the tank rises. This escaping stream of air passing through the vent pipe from the open lower end causes actuation of the audible whistle which continues until the rising liquid level contacts with and blocks the open lower end of the vent pipe against further escape of gas or air therethrough. Continued delivery of liquid with a consequent rising level will cause venting of air or gas through the side openings 28, as shown in Fig. 1, this air also passing through the audible whistle. Although these openings provide for continued venting and avoid excessive pressure increase if the tank is filled beyond the lower end of the vent pipe, nevertheless no actuation of the audible signal takes place after the lower end of the vent pipe has been blocked. Neither do these openings, if properly constructed, interfere with the actuation of the audible signal on account of the air stream entering through the lower end of the vent.

Figure 4:
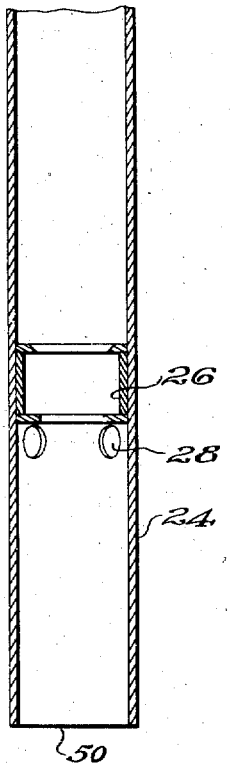
Figs. 4, 5 and 6 are sections in elevation illustrating alternative methods of varying the air stream to provide operation of the audible signal.
Figure 5:
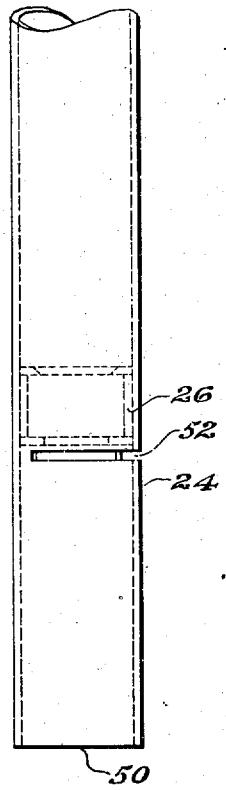
Figure 6:
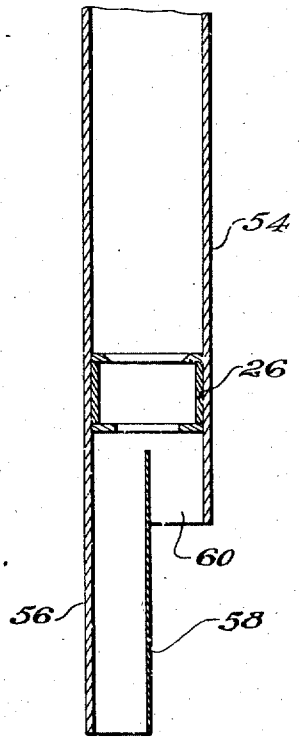
Figure 7:
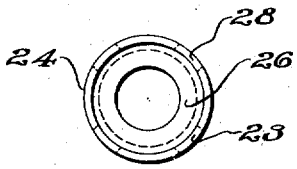
Figs. 7, 8 and 9 are end views respectively of the constructions shown in each of Figs. 4, 5 and 6.

Illustrated in Figs. 4 to 9 inclusive are a series of alternative constructions, all of which serve as combined vents and audible signal devices to permit continuous venting through the same conduit so long as filling continues, but to discontinue audible signaling when the filling level reaches the open lower end of the vent pipe. Indicated in Figs. 4 and 7 is an enlarged view of the construction shown in Figs. 1 to 3 inclusive. In this view, the lower end of the vent pipe is indicated at 24 and is provided with an orificed whistle 26 of conventional form fitting closely in the vent and with supplementary vent openings 28 in the side of the vent pipe below the whistle and in proximity thereto. So long as the air stream enters the vent pipe through the open lower end 50, actuation of the whistle takes place. When this open lower end is blocked by rising liquid, continued venting may take place through one or more openings 28 without, however, causing actuation of the signal if the openings are located in sufficiently close proximity to the whistle device to avoid straightening out of the air stream before it reaches the whistle. In addition, the supplementary vent openings should be smaller in their combined area than the area available for venting through the open lower end in order that the venting of air through the open lower end until this portion is trapped shall constitute the path of least resistance for all flow of air therethrough.

Figure 8:
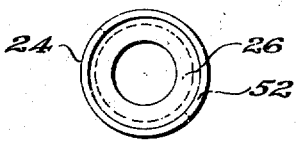

In Figs. 5 and 8 is illustrated a similar but not identical construction which has an equivalent mode of operation. In this construction, the vent pipe 24 is provided with the same whistle 26 and the open lower end 50, but the circular or round vent openings have substituted therefor an elongated and comparatively narrow slot 52 in the side of the vent tube below the whistle.

Figure 9:
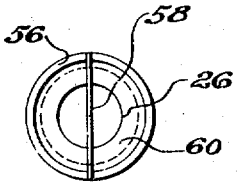

In Figs. 6 and 9 is illustrated a third form in which a vent tube 54 is reduced at its lower end 56 through the employment of a lengthwise partition 58 extending transversely of the tube, as indicated in Fig. 9. This partition extends into proximity to the whistle 26 and at the opposite side thereof is provided a supplemental vent 60 produced by cutting away a portion of the tube, as will be clearly evident. With this construction, so long as the open lower end of the vent is above the liquid level and gas can be freely vented through the tube on both sides of the partition, actuation of the whistle is produced. When the open lower end is blocked, however, further venting would occur through the supplementary vent 60 without, however, actuating the whistle. Although the flow produced by this device may be somewhat different from that produced by the openings in the wall of the tube, nevertheless the resultant effect, namely, sounding of the audible signal with cessation when the lower end of the tube is blocked, is the same in all cases.

The foregoing constructions illustrate in part the variations which may be made in the actual devices without departing from the scope of the invention. As stated previously, although the exact theory upon which these constructions operate is not fully and completely understood, nevertheless it is quite evident that an air stream entering the tube below the whistle through an orifice of ample capacity will satisfactorily actuate the whistle and that additional openings presumably of smaller capacity or baffled to present greater resistance will not interfere with this operation. On the other hand, when entrance of the air stream in this manner is precluded, and the air compelled to enter through the side of the vent tube or in a manner which unbalances the air stream or creates turbulence, the whistle will not operate. It should be understood in this connection, however, that turbulence or unbalancing of the air stream must occur at the whistle to avoid operation as the utilization of supplementary openings in a long tube with the openings sufficiently removed from the whistle by a length of tube would permit smoothing out of the air stream and would defeat the result sought for. Generally speaking, supplementary openings or passages located in sufficiently close proximity to the whistle to cause turbulence of the air stream impinging on the whistle will avoid sounding thereof and these same openings or passages, if they provide sufficient restriction to cause the air stream to normally flow through the open lower end, will not interfere with the correct sounding of the whistle through an air stream entering in this manner.

We claim:

1. The combination with a liquid tank, of a conduit having an open lower end below the top of the tank and serving as a vent without the tank, an audible signal in series with the conduit and normally actuated by a stream of gas or vapor entering the conduit through the open lower end when the rising liquid level is below this end of the conduit, and a supplementary opening delivering air or gas at the side of the conduit at such a location relative to the signal and in such a manner, when the open lower end is sealed and venting continues through the conduit and the signal, as to avoid actuation of the signal.

2. The combination with a liquid tank, of a conduit having an open lower end below the top of the tank and serving as a vent without the tank, an audible signal in series with the conduit and normally actuated by a stream of gas or vapor entering the conduit through the open lower end when the rising liquid level is below this end of the conduit, and a supplementary opening in the side of the conduit in such close proximity to the signal and of less area than the opening at the lower end of the conduit and so constructed as to vent air or gas through the signal device after the lower end of the conduit has been sealed in such a turbulent manner as to avoid actuation of the signal device.

3. The combination with a liquid tank, of a conduit having an open lower end below the top of the tank and serving as a vent without the tank, an audible signal in series with the conduit and normally actuated by a stream of gas or vapor entering the conduit through the open lower end when the rising liquid level is below this end of the conduit, and a circumferentially extending series of openings formed in the side of the conduit in such close proximity to the signal, and being of less total area than the opening at the lower end of the conduit, to vent air or gas through the signal device after the lower end of the conduit has been sealed in such a turbulent manner as to avoid actuation of the signal device.

4. The combination with a closed container of a venting conduit extending into the container below the top thereof and open at its lower end, an audible signaling device in series with and intermediate the ends of said conduit, that portion of the conduit between the lower open end and said device being provided with a plurality of passages including the passage through the lower open end through which gas may pass and merge on its way to said device to cause an audible signal to be produced when all of said passages are open and the liquid level is rising and is below the lower open end passage of said conduit, the entrance to one of said passages being located below the entrance to another of said passages so that the lower entrance may be trapped by rising liquid level first, thereby to alter the nature of the gas flow to said device and in consequence to alter the signal while still permitting continued venting of gas or vapor through said device.

5. The combination with a closed container of a venting conduit extending into the container below the top thereof and open at its lower end, an audible signaling device in series with and intermediate the ends of said conduit and located above the lower end, that portion of the conduit between the lower open end and said device being provided with a plurality of passages including the passage through the lower open end on the inner side, said passages so located that when all are open and gas is flowing therethrough and merging, as the liquid level is rising, said device will give a signal, but when the lower open end passage is trapped by rising liquid to cause a change in the flow of gas to said device, said signal will be changed, although venting continues through said device.

6. The combination with a closed container of a fill pipe for conveying liquid to said container and a venting conduit extending into the container below the top thereof and open at its lower end, an audible signaling device in series with and intermediate the ends of said conduit, that portion of the conduit between the lower open end and said device being provided with a plurality of passages including the passage through the lower open end, the entrances to said passages being at different vertical levels, the flow of gas through said passages merging while the liquid level is rising and resulting in a stream of gas impinging on said signaling device in such manner as to result in a gas flow therethrough that will produce a signal, but upon the trapping of the lower open end passage by the rising liquid level the resulting flow of gas through said untrapped passages will be directed thereby with respect to said signaling device so as to cause the gas to impinge on and flow through said signaling device in such manner as to change said signal while still permitting continued venting therethrough, means for substantially preventing gas from escaping through said fill pipe while said container is being filled, and means for preventing the liquid entering through said fill pipe from interfering with the venting of gas through said conduit.

7. The combination with a closed container of a fill pipe for conveying liquid to said container and a venting conduit extending into the container below the top thereof and open at its lower end, an audible signaling device in series with and intermediate the ends of said conduit, that portion of the conduit between the lower open end and said device being provided with a plurality of passages including the passage through the lower open end, the entrances to said passages being at different vertical levels, the flow of gas through said passages merging while the liquid level is rising and resulting in a stream of gas impinging on said signaling device in such manner as to result in a gas flow therethrough that will produce a signal, but upon the trapping of the lower open end passage by the rising liquid level the resulting flow of gas through said untrapped passages will be directed thereby with respect to said signaling device so as to cause the gas to impinge on and flow through said signaling device in such manner as to change said signal while still permitting continued venting therethrough, said fill pipe being bent to such an extent that liquid passing through at not less than the rate normally used in filling said container will substantially close said fill pipe against escape of gas during filling.

8. The combination with a closed container of a fill pipe for conveying liquid to said container and a venting conduit extending into the container below the top thereof and open at its lower end, an audible signaling device in series with and intermediate the ends of said conduit, that portion of the conduit between the lower open end and said device being provided with a plurality of passages including the passage through the lower open end, the entrances to said passages being at different vertical levels, the flow of gas through said passages merging while the liquid level is rising and resulting in a stream of gas impinging on said signaling device in such manner as to result in a gas flow therethrough that will produce a signal, but upon the trapping of the lower open end passage by the rising liquid level the resulting flow of gas through said untrapped passages will be directed thereby with respect to said signaling device so as to cause the gas to impinge on and flow through said signaling device in such manner as to change said signal while still permitting continued venting therethrough, said fill pipe being bent to such an extent that liquid passing through at not less than the rate normally used in filling said container will close said fill pipe against escape of gas during filling, and means comprising a baffle located between said fill pipe and the inner end of said conduit for preventing the entering liquid from interfering with the venting of gas through said conduit.

9. The combination with a closed container of a fill pipe for conveying liquid to said container and a venting conduit extending into the container below the top thereof and open at its lower end, an audible signaling device in series with and intermediate the ends of said conduit, that portion of the conduit between the lower open end and said device being provided with a plurality of passages including the passage through the lower open end, the entrances to said passages being at different vertical levels, the flow of gas through said passages merging while the liquid level is rising and resulting in a stream of gas impinging on said signaling device in such manner as to result in a gas flow therethrough that will produce a signal, but upon the trapping of the lower open end passage by the rising liquid level the resulting flow of gas through said untrapped passages will be directed thereby with respect to said signaling device so as to cause the gas to impinge on and flow through said signaling device in such manner as to change said signal while still permitting continued venting therethrough, said fill pipe extending substantially to the bottom of the tank whereby gas will be prevented from escaping through said fill pipe during the latter stages of filling and whereby the entering liquid will be prevented from interfering with the venting of gas through said conduit.

10. The combination with a closed container of a fill pipe for conveying liquid to said container and a conduit extending into the container below the top thereof and open at its lower end, an audible signaling device in series with and intermediate the ends of said conduit and normally actuated by a stream of gas entering the conduit from the open end when the rising liquid level is below the lowermost portion of the conduit, means provided on the conduit below the signaling device for permitting continued escape of gas through said device and conduit after the lower end of said conduit has been sealed by rising liquid level to cause a change in the signal given by said device, means for substantially preventing gas from escaping through said fill pipe while said container is being filled, and means for preventing the liquid entering through said fill pipe from interfering with the venting of gas through said conduit.

11. The combination with a closed container of a fill pipe and a venting conduit extending into the container below the top thereof and open at its lower end, an audible signaling device in series with and intermediate the ends of said conduit and operable by gas entering the conduit from the open end when the rising liquid level is below the lowermost portion of the conduit, means provided on the conduit below the signaling device for permitting continued escape of gas through said device after the lower end of said device has been sealed by rising liquid level to cause a change in said signal, the inner end of said conduit located in the line of liquid entering said container through said fill pipe, and a baffle located between the inner end of said conduit and said fill pipe to prevent the entering liquid from interfering with the venting of gas through said conduit.

12. The combination with a closed container of a fill pipe and a venting conduit extending into the container below the top thereof and open at its lower end, an audible signaling device in series with and intermediate the ends of said conduit and operable by gas entering the conduit from the open end when the rising liquid level is below the lowermost portion of the conduit, means provided on the conduit below the signaling device for permitting continued escape of gas through said device after the lower end of said conduit has been sealed by rising liquid level to cause a change in said signal, said fill pipe extending substantially to the bottom of the tank whereby gas will be prevented from escaping through said fill pipe during the latter stages of filling and whereby the entering liquid will be prevented from interfering with the venting of gas through said conduit.

13. The combination with a closed container of a fill pipe and a venting conduit extending into the container below the top thereof and open at its lower end, an audible signaling device in series with and intermediate the ends of said conduit and operable by gas entering the conduit from the open end when the rising liquid level is below the lowermost portion of the conduit, means provided on the conduit below the signaling device for permitting continued escape of gas through said device after the lower end of said conduit has been sealed by rising liquid level to cause a change in said signal, and a baffle located in the path of the liquid entering the tank through said fill pipe, said baffle so positioned to cause that portion of the fill pipe exterior of the baffle to run substantially full to prevent any appreciable venting through said fill pipe during filling.

FRANK P. SCULLY.
ALCIDE E. MATHEY.